(12) United States Patent
Jeong et al.

(10) Patent No.: US 9,664,429 B2
(45) Date of Patent: May 30, 2017

(54) COUPLING MECHANISM FOR AN ICE BUCKET AND REFRIGERATOR HAVING THE ICE BUCKET

(71) Applicant: SAMSUNG ELECTRONICS CO., LTD., Suwon-si (KR)

(72) Inventors: Jin Jeong, Yongin-si (KR); Do Hyung Kim, Suwon-si (KR); Kook Jeong Seo, Suwon-si (KR); Bong Su Son, Cheonan-si (KR); Byung Suk An, Suwon-si (KR); Do Yun Jang, Pusan (KR); Kyoung Ki Park, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 14/230,366

(22) Filed: Mar. 31, 2014

(65) Prior Publication Data
US 2014/0290300 A1    Oct. 2, 2014

(30) Foreign Application Priority Data
Apr. 2, 2013 (KR) .................. 10-2013-0036050

(51) Int. Cl.
*F25C 5/00* (2006.01)
*F16D 11/16* (2006.01)
(Continued)

(52) U.S. Cl.
CPC .............. *F25C 5/007* (2013.01); *F16D 11/16* (2013.01); *F16D 13/00* (2013.01); *F16D 13/06* (2013.01);
(Continued)

(58) Field of Classification Search
CPC .......... F25C 5/005; F25C 5/046; F25C 5/182; F25C 5/185; F16D 13/00; F16D 13/06; F16D 13/10
See application file for complete search history.

(56) References Cited

U.S. PATENT DOCUMENTS

| 4,176,527 A | * | 12/1979 | Linstromberg | ......... F25C 5/046 222/240 |
| 5,273,219 A | * | 12/1993 | Beach, Jr. | ............... F25C 5/005 222/240 |

(Continued)

FOREIGN PATENT DOCUMENTS

WO    2008/035913 A1    3/2008

OTHER PUBLICATIONS

European Search Report dated Mar. 26, 2015 issued in corresponding European Patent Application 14159523.1.

Primary Examiner — Allen Flanigan
Assistant Examiner — Filip Zec
(74) Attorney, Agent, or Firm — Staas & Halsey LLP

(57) ABSTRACT

A refrigerator includes a driving coupler to transmit a driving force and a connecting member to transmit the driving force of the driving coupler to a transfer member. The connecting member is rotated when interference with the driving coupler occurs in a process of connecting with the driving coupler and idles within a predetermined angle range regardless of the transfer member. With this constitution, even when ice cubes are loaded by the transfer member, the connecting member may be smoothly rotated. Thus, the driving coupler and the connecting member may be smoothly connected without an impact.

9 Claims, 17 Drawing Sheets

(51) Int. Cl.
   *F25C 5/18*    (2006.01)
   *F16D 13/10*   (2006.01)
   *F16D 13/06*   (2006.01)
   *F25C 5/04*    (2006.01)
   *F16D 13/00*   (2006.01)

(52) U.S. Cl.
   CPC .............. *F16D 13/10* (2013.01); *F25C 5/005* (2013.01); *F25C 5/046* (2013.01); *F25C 5/182* (2013.01); *F25C 5/185* (2013.01)

(56) References Cited

U.S. PATENT DOCUMENTS

| | | | | |
|---|---|---|---|---|
| 5,956,998 A * | 9/1999 | Fenelon | ................... | E05B 81/25 292/144 |
| 6,442,954 B1 * | 9/2002 | Shapiro | ................... | F25C 5/005 62/137 |
| 6,868,748 B2 * | 3/2005 | Brill | ................... | F16D 3/04 74/410 |
| 8,151,594 B2 * | 4/2012 | Kim | ................... | F25C 5/007 464/182 |
| 8,408,016 B2 * | 4/2013 | McCollough | ............. | F25C 5/04 62/135 |
| 8,657,093 B1 * | 2/2014 | Kalinsky | ................ | F16D 69/00 192/107 M |
| 2005/0132739 A1 | 6/2005 | Sannasi et al. | | |
| 2009/0133428 A1 | 5/2009 | An et al. | | |
| 2011/0146335 A1 | 6/2011 | Jung et al. | | |

* cited by examiner

COUPLING MECHANISM FOR AN ICE BUCKET AND REFRIGERATOR HAVING THE ICE BUCKET

CROSS-REFERENCE TO RELATED APPLICATIONS

This application claims the benefit of Korean Patent Application No. 10-2013-0036050, filed on Apr. 2, 2013 in the Korean Intellectual Property Office, the disclosure of which is incorporated herein by reference.

BACKGROUND

1. Field

The following description relates to a power delivery structure between a transfer member of an ice bucket of a refrigerator and a transfer motor.

2. Description of the Related Art

In general, a refrigerator is a household appliance that is equipped with at least one storage compartment to store foodstuffs and a cooled air supply system to supply cooled air to the storage compartment and stores the foodstuffs in a fresh state. The refrigerator is also equipped with an icemaker that makes ice cubes for the convenience of use. Particularly, the refrigerator is also equipped with an automatic icemaker that automates a process of making ice cubes, a process of storing the made ice cubes, and a process of discharging the stored ice cubes to a dispenser.

Such an automatic icemaker includes an ice tray used to make ice cubes, an ice bucket to store the ice cubes made at the ice tray, a transfer member provided inside the ice bucket so as to transfer the ice cubes of the ice bucket, and a transfer motor to drive the transfer member. The transfer member receives a driving force from the transfer motor via a coupling device.

The coupling device includes a driven coupler coupled to a rotating shaft of the transfer member and a driving coupler coupled to a driving shaft of the transfer motor. When the transfer motor is driven with the driving and driven couplers connected to each other, the driving force of the transfer motor may be transferred to the transfer member.

Generally, the driving coupler has wings to protrude toward the driven coupler, and the driven coupler has ribs formed so as to be spaced apart in a circumferential direction. When the driving and driven couplers are connected, the wings of the driving coupler are inserted between the ribs of the driven couplers. In this state, when the driving coupler is rotated, the wings of the driving coupler come into contact with lateral portions of the ribs of the driven coupler, so that a driving force may be transmitted.

However, in a process of connecting the driving coupler and the driving coupler, the wings of the driving coupler may contact with front portions of the ribs of the driven couplers, and thus the driving coupler and the driven coupler may not be connected. The reason this phenomenon occurs is that, when the driving coupler and the driven coupler are intended to be connected, the wings of the driving coupler and the ribs of the driven coupler are located at interfering positions.

In this case, the component may be damaged due to an impact caused by the collision. The ice bucket should be demounted and then mounted again for the connection of the driving and driven couplers.

SUMMARY

Additional aspects and/or advantages will be set forth in part in the description which follows and, in part, will be apparent from the description, or may be learned by practice of the disclosure.

Therefore, it is an aspect of the present disclosure to provide a refrigerator having a coupler in which driving and driven couplers may be smoothly connected without a great impact regardless of positions of the driving and driven couplers when an ice bucket is mounted on a transfer motor.

In other words, the aspect of the present disclosure is to provide a refrigerator having a coupler in which driving and driven couplers may be connected even if wings of the driving coupler and ribs of the driven coupler are located at interfering positions when the driving coupler and the driven coupler are intended to be connected.

It is another aspect of the present disclosure to provide a refrigerator having a coupler in which an external design is improved, and safety and use convenience of a user is increased.

Additional aspects of the disclosure will be set forth in part in the description which follows and, in part, will be apparent from the description, or may be learned by practice of the disclosure.

In accordance with one aspect of the present disclosure, a refrigerator includes: an icemaker to generate ice cubes; an ice bucket to store the ice cubes generated by the icemaker; a transfer member to transfer the ice cubes of the ice bucket; a driving motor to generate a driving force driving the transfer member; a driving coupler coupled to the driving motor; and a connecting member to transmit the driving force of the driving coupler to the transfer member, the connecting member being loosely coupled to the transfer member so that a process of connecting with the driving coupler is completed by idling within a predetermined angle range regardless of the transfer member even when interference with the driving coupler takes place in the process of connecting with the driving coupler.

The refrigerator may further include a supporting member that contacts with ribs of the connecting member to receive the driving force and supports the connecting member.

The refrigerator may further include a fixing member that couples the supporting member to a rotational shaft of the transfer member.

The supporting member may include a body having a hollow space and a disc that extends from one end portion of the body in a radial direction and supports an inner circumference of the connecting member.

The disc may include recesses through which the ribs of the connecting member pass.

The recess may be formed larger than the rib so as to allow the connecting member to independently idle within a predetermined angle range without pressuring the supporting member.

The refrigerator may further include a positioning member that connects the supporting member and the connecting member so as to adjust a relative position of the connecting member relative to the supporting member.

The fixing member may include a body coupled to the supporting member and the transfer member and a head formed at one end of the body so as to prevent separation of the supporting member.

The fixing member, the supporting member, and the transfer member may be rotated together.

The connecting member may have an idling direction that is opposite to a direction in which the connecting member is rotated so as to transmit the driving force to the transfer member.

In accordance with another aspect of the present disclosure, a refrigerator includes: a main body having a storage compartment; a door rotatably coupled to the main body so as to open and close the storage compartment; an icemaker provided at the door; an ice bucket that is provided at the door so as to store ice cubes generated by the icemaker and has a transfer member to transfer the stored ice cubes; a driving motor that is provided at the main body and generates a driving force; a driving coupler that is coupled to the driving motor and transmits the driving force; and a driven coupler that is coupled to the transfer member and receives the driving force. The driven coupler includes a plurality of slide members arranged in a circumferential direction, and a portion of the plurality of slide members are provided so as to be retreated in an axial direction by pressurization of the driving coupler when coupled with the driving coupled.

When the driving motor is driven in a state in which a portion of the plurality of slide members are pressurized by the driving coupler and retreated in an axial direction, the driving coupler may come into contact with lateral portions of the slide members adjacent to the retreated slide members and apply a rotating force to the slide members.

The driven coupler may further include a plurality of elastic members to elastically support the plurality of slide members.

The driven coupler may further include a filler member that is disposed in an inner center of the plurality of slide members and supports the plurality of slide members.

The driven coupler may further include a elastic member to elastically support the filler member.

The driving coupler and the slide members may contact with each other when the driving coupler contacts with the lateral portions of the slide members and applies the rotating force to the slide members.

The driving coupler may include an insertion nose, a cover provided so as to movable forward or backward outside the insertion nose and to hide the insertion nose when the door is opened, and an elastic member to elastically support the cover so that the cover hides the insertion nose.

According to the refrigerator of the present disclosure, when an ice bucket is mounted on a transfer motor, the driving and driven couplers may be smoothly connected regardless of positions of the driving and driven couplers.

Further, in a refrigerator in which an ice bucket is provided at a door and a transfer motor is provided at a main body, the driving and driven couplers are hidden when the door is opened. Thus, an external design of the refrigerator may be improved, and the safety and use convenience of a user may be increased.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
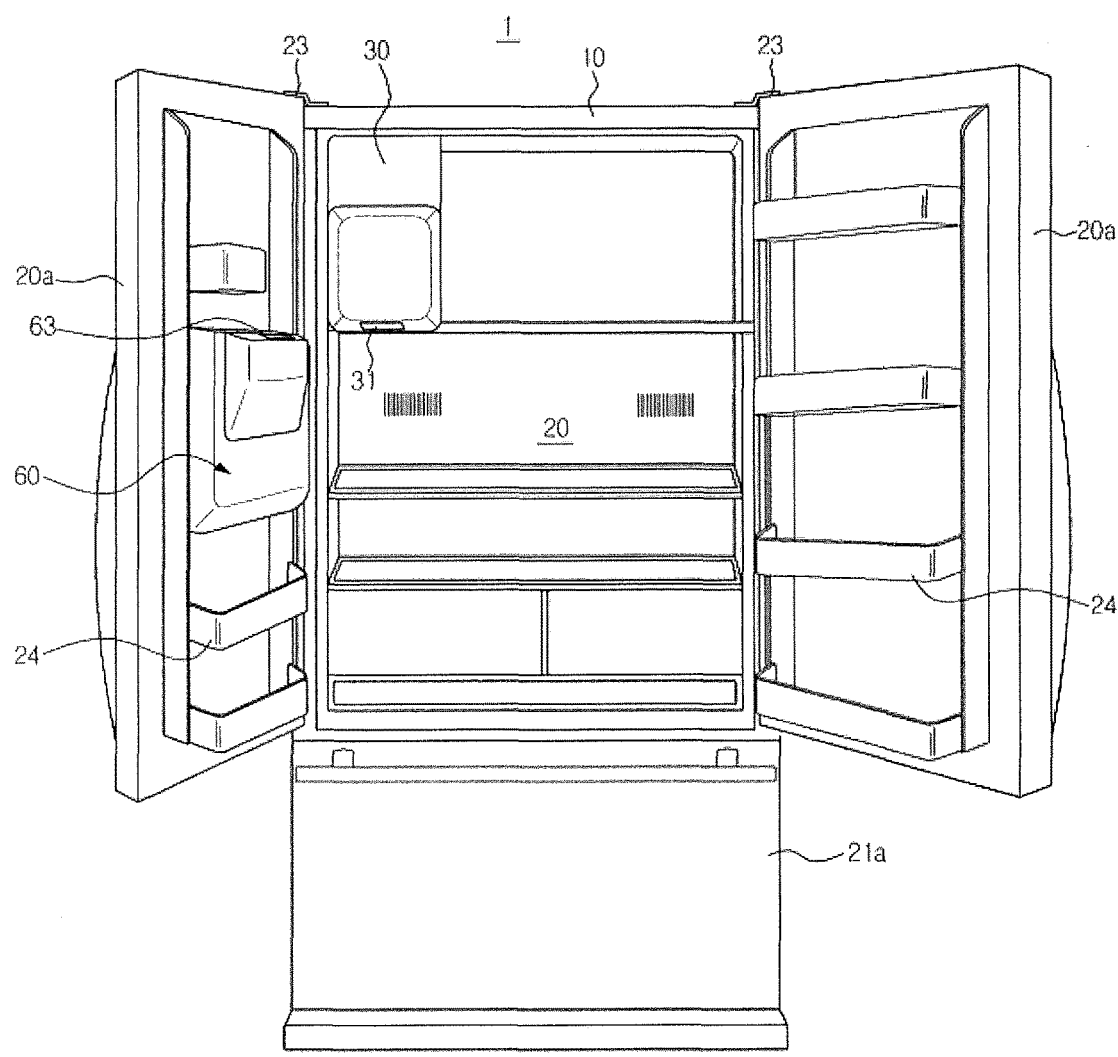
FIG. 1 shows a refrigerator in accordance with a first embodiment of the present disclosure.

Reference will now be made in detail to embodiments of the present disclosure, examples of which are illustrated in the accompanying drawings, wherein like reference numerals refer to like components throughout.

Figure 2:
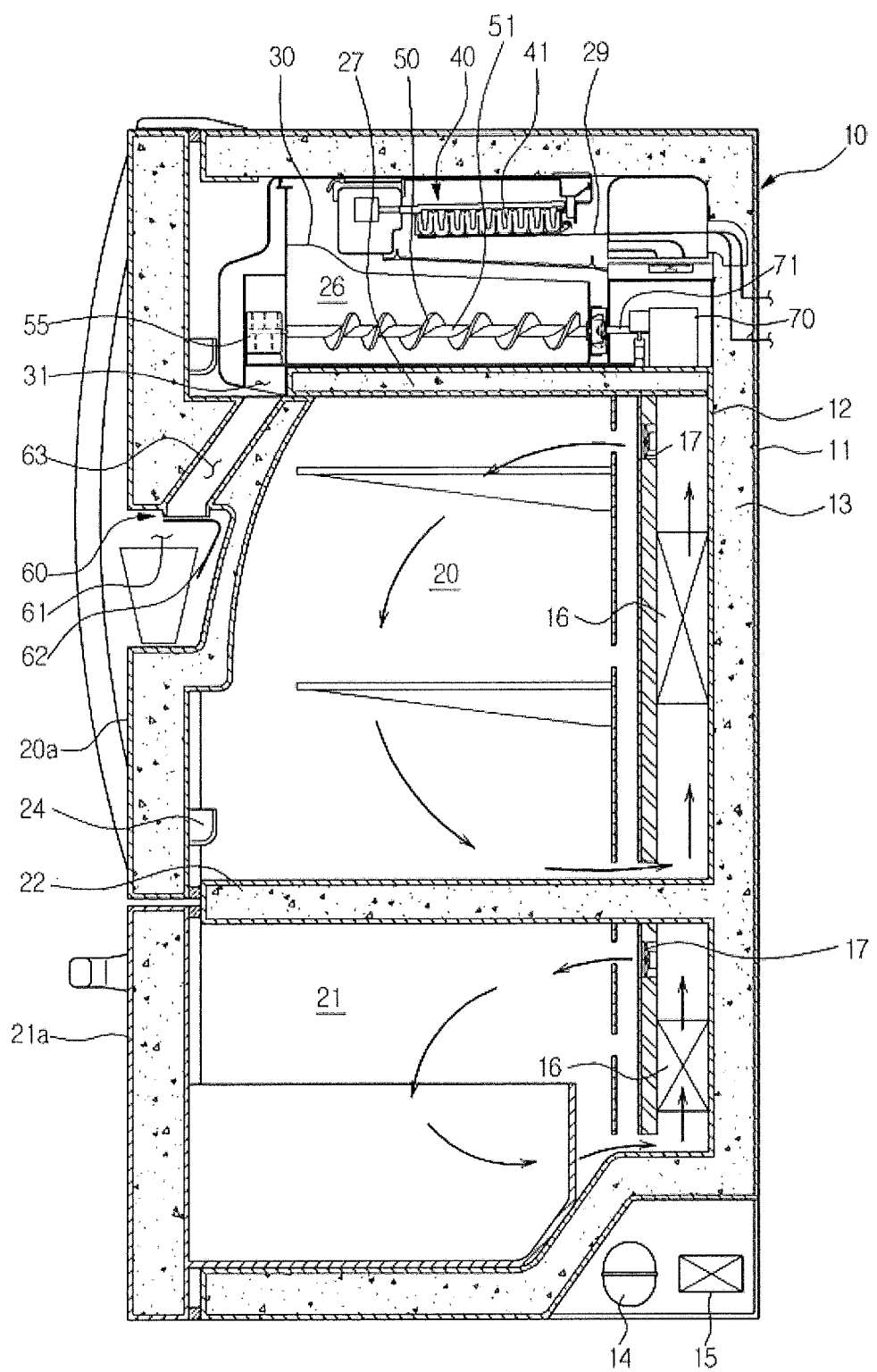
FIG. 2 is a schematic side cross-sectional view of the refrigerator of FIG. 1.

FIG. 1 shows a refrigerator in accordance with an embodiment of the present disclosure, and FIG. 2 is a schematic side cross-sectional view of the refrigerator of FIG. 1.

Referring to FIGS. 1 and 2, the refrigerator 1 includes a main body 10, storage compartments 20 and 21 provided inside the main body 10, and a cooled air supply system to supply cooled air to the storage compartments 20 and 21.

The main body 10 includes an outer case 11 forming a geometry, an inner case 12 provided inside the outer case 11 and forming the storage compartments 20 and 21, and an insulator 13 disposed between the outer case 11 and the inner case 12 and insulating the storage compartments 20 and 21.

The storage compartments 20 and 21 may be partitioned into an upper refrigerating compartment 20 and a lower freezing compartment 21 by a horizontal partition 22. However, the present disclosure is not limited thereto. For example, the storage compartments 20 and 21 may be partitioned into an upper freezing compartment and a lower refrigerating compartment. Further, a vertical partition may be provided to divide the storage compartments into left/right refrigerating compartment and right/left freezing compartment. Further, the refrigerator may only includes a freezing compartment(s) or a refrigerating compartment(s). The refrigerating compartment 20 is provided so that a front portion, for example, a front face thereof, is open so as to be able to carry into or out foodstuffs, and the open front face may be opened or closed by refrigerating compartment doors 20a. The refrigerating compartment doors 20a may be rotatably coupled to the main body 10 by hinge members 23. Each refrigerating compartment door 20a may be provided with door pockets 24 in the rear portion to store additional food thereof.

A freezing compartment door 21a may be slidably installed and be provided with a basket in the rear portion thereof.

The cooled air supply system may include a compressor 14, a condenser 15, an evaporator 16, an expansion valve (not shown), and a circulating fan 17. The cooled air supply system may operate a cooling cycle to generate cooled air and supply the cooled air to the storage compartments 20 and 21.

Meanwhile, an ice making compartment 26 partitioned from the refrigerating compartment 20 may be formed at one side above the refrigerating compartment 20. The ice making compartment 26 is provided so as to be partitioned from the refrigerating compartment 20 by the partition 27. However, the present disclosure is not limited thereto. The ice making compartment may be provided so as to be partitioned from the freezing compartment by the partition if the freezing compartment is provided in the upper compartment, or the ice making compartment may be integrated into the freezing compartment.

As shown in FIG. 2, the ice making compartment 26 may be directly supplied with the cooled air from a refrigerant pipe 29 extending thereinto. However, although not shown, it is apparent that the cooled air generated outside the ice making compartment 26 may be supplied into the ice making compartment 26 through a separate duct.

The ice making compartment 26 is provided with an icemaker to generate ice cubes and an ice bucket 30 to store the ice cubes.

The icemaker may include an ice making tray 40 that is supplied with water and generates the ice cubes and a scraper 41 that separates the ice cubes of the ice making tray 40 from the ice making tray 40.

The ice bucket 30 may be provided with a transfer member 50 to transfer the ice cubes and a crusher 55 to crush the ice cubes.

The refrigerating compartment door 20a may be provided with a dispenser 60 that enables a user to extract the ice cubes of the ice making compartment 26 or the water of the refrigerating compartment 20 without opening the refrigerating compartment door 20a. The dispenser 60 may include an extraction space 61, an operation switch 62, and a chute 63 connecting an outlet 31 of the ice bucket 30 and the extraction space 61.

The transfer member 50 may be horizontally disposed in an approximately spiral shape. Thus, when the transfer member 50 is rotated, the ice cubes of the ice bucket 30 may be displaced toward the crusher 55 or the outlet 31 in a horizontal direction.

The transfer member 50 is supplied with a driving force from a driving motor 70 provided in the ice making compartment 26. Particularly, the driving motor 70 is fixedly disposed in the ice making compartment 26, whereas the ice bucket 30 is provided so as to be able to be separated from the ice making compartment 26.

Therefore, the driving motor 70 and the transfer member 50 are provided with a coupler that decouples them when the ice bucket 30 is separated from the ice making compartment 26 and couples them to be able to supply powder when the ice bucket 30 is mounted in the ice making compartment 26.

Figure 3:
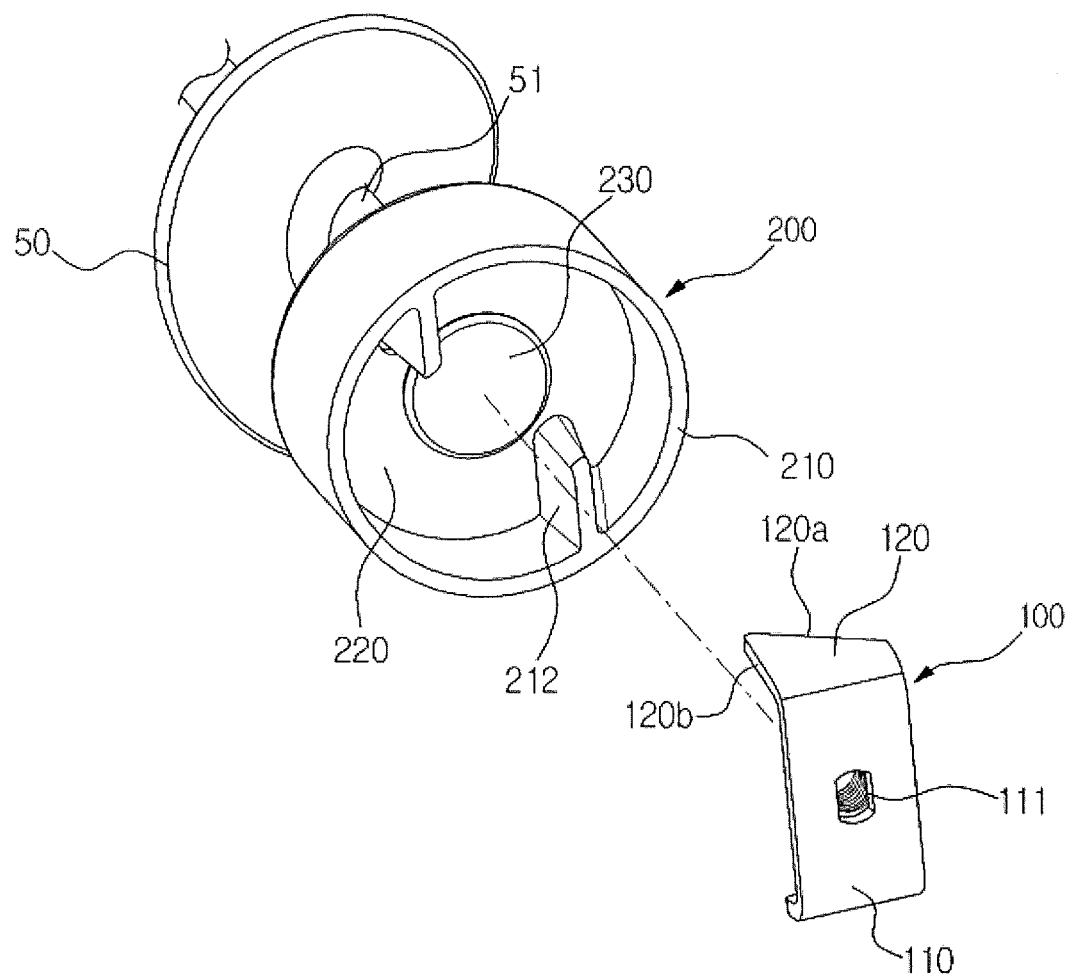
FIG. 3 schematically shows a coupler of the refrigerator of FIG. 1.
Figure 4:
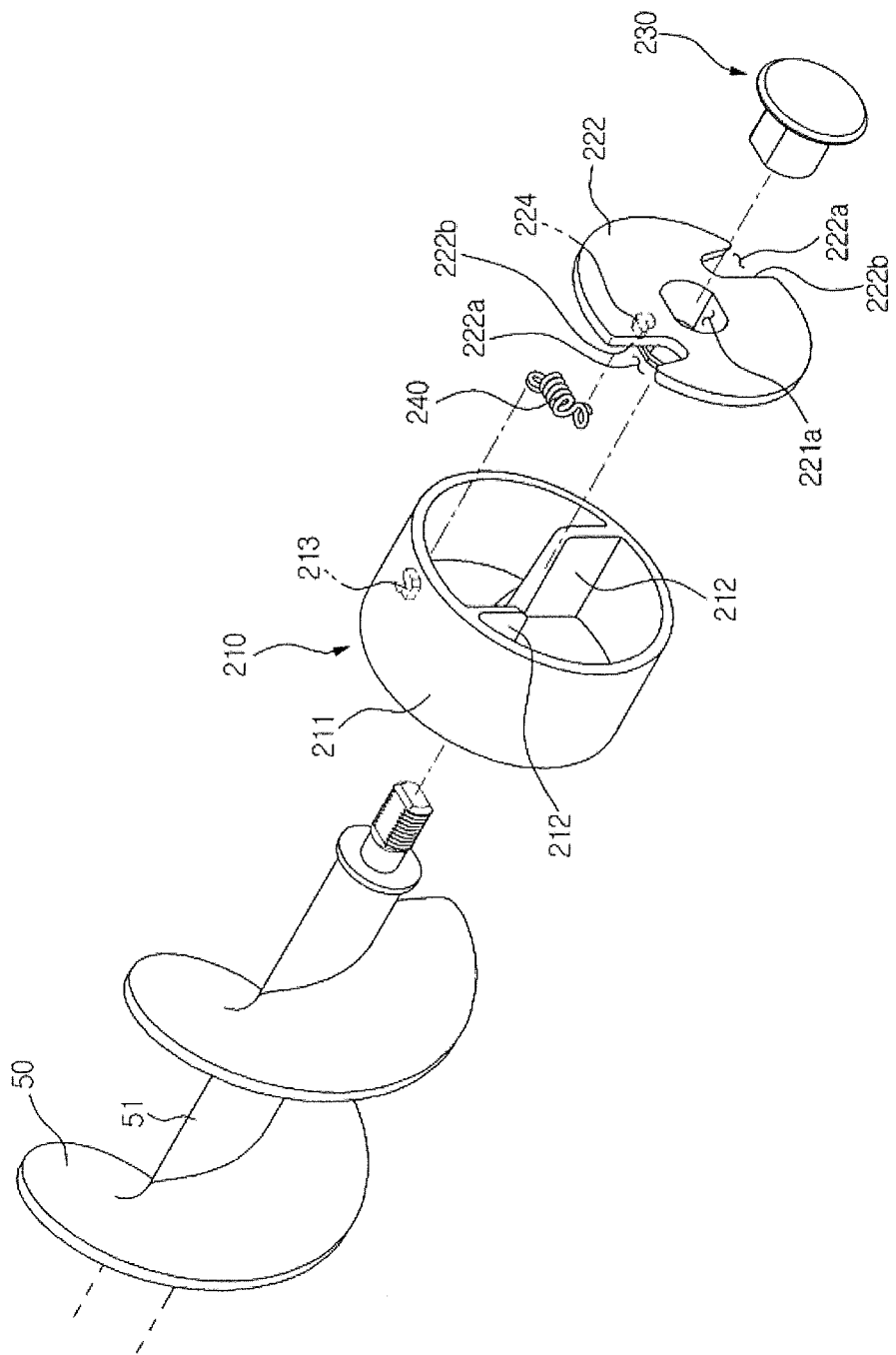
FIG. 4 is an exploded perspective view showing a constitution of a driven coupler of the refrigerator of FIG. 1.
Figure 5:
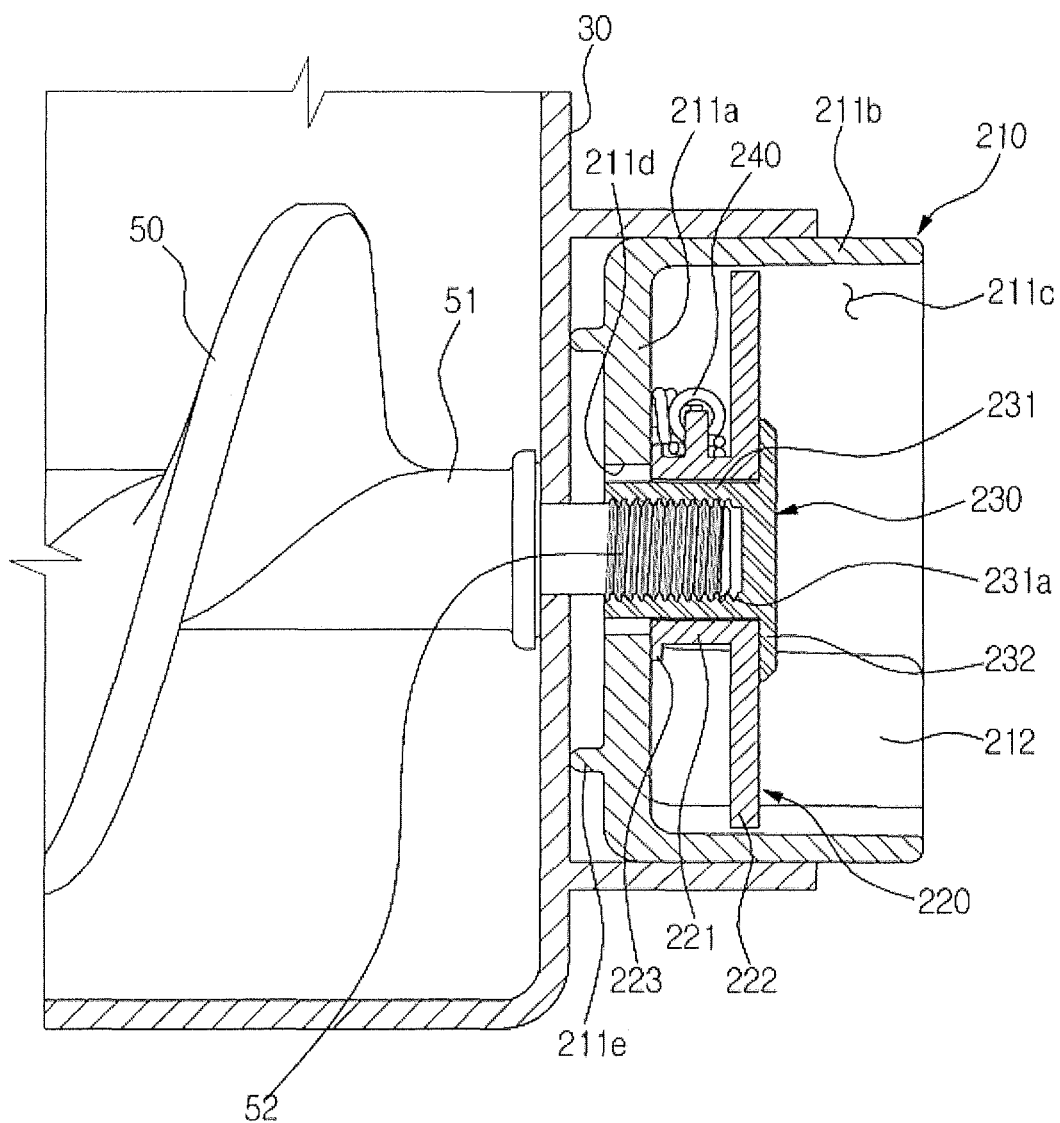
FIG. 5 is a cross-sectional view showing a state in which the driven coupler of the refrigerator of FIG. 1 is coupled to a transfer member.
Figure 6:
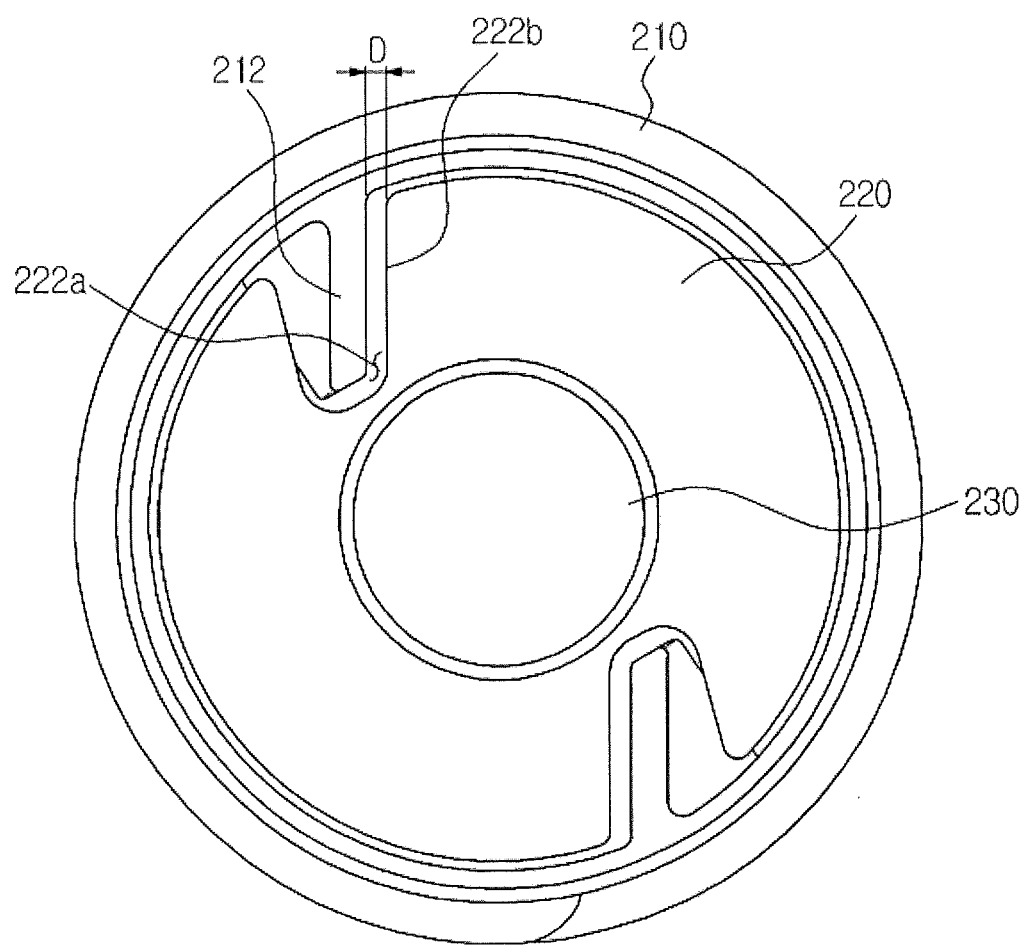
FIG. 6 shows a basic state of the driven coupler of the refrigerator of FIG. 1.

FIG. 3 schematically shows a coupler of the refrigerator of FIG. 1. FIG. 4 is an exploded perspective view showing a constitution of a driven coupler of the refrigerator of FIG. 1. FIG. 5 is a cross-sectional view showing a state in which the driven coupler of the refrigerator of FIG. 1 is coupled to a transfer member. FIG. 6 shows a basic state of the driven coupler of the refrigerator of FIG. 1.

The coupler is made up of a driving coupler 100 coupled to a driving shaft 71 of the driving motor 70 and a driven coupler 200 coupled to a rotational shaft 51 of the transfer member 50. In a conventional coupler, the driving and driven couplers 100 and 200 may collide each other and fail to be coupled to each other when the ice bucket 30 is mounted in the ice making compartment 26.

In the present disclosure, when the ice bucket 30 is mounted in the ice making compartment 26, the driving and driven couplers 100 and 200 may be smoothly coupled. Hereinafter, details of the coupler of the present disclosure will be described.

Referring to FIGS. 3 to 6, the driving coupler 100 may have the form of an approximately C-shaped bracket. The driving coupler 100 may include a support 110 in which a shaft hole 111 is formed and wings 120 bent forward from opposite ends of the support 110. The driving shaft 71 of the driving motor 70 may be coupled to the shaft hole 111. The driving coupler 100 may be rotated together with the driving shaft 71.

At least one wing 120 has an inclined portion, for example, an inclined face 120a to idle a rib 212 under pressure when colliding with a front portion, for example, a front face of the rib 212 of the driven coupler 200 and a pressurizing portion, for example, a pressurizing face 120b to pressurize a lateral portion, for example, a lateral face of the rib 212 to transmit a driving force to the driven coupler 200.

Meanwhile, the driven coupler 200 may include a connecting member 210 that is loosely coupled to the transfer member 50 so as to transmit the driving force to the transfer member 50 and is rotated at a predetermined angle relative to the transfer member 50 when interference with the driving coupler 100 occurs in a process of connecting with the driving coupler 100, so that the interface may be removed by the relative rotation and thus the connecting process may be completed, a supporting member 220 and a fixing member 230 that are coupled to the transfer member 50 and mediate the loose coupling of the connecting member 210 and the transfer member 50, and a positioning member 240 that connects the connecting member 210 and the supporting member 220 so as to adjust a position of the connecting member 210 relative to the supporting member 220.

The connecting member 210 includes a guide 211 having a cylindrical shape, ribs 212 that protrude from an inner circumference of the guide 211, is in contact with the wings 120 of the driving coupler 100, and receives a driving force, and a first joint 213 to which one end of the positioning member 240 is coupled. The positioning member 240 may be integrally formed.

The guide 211 may have a bottom wall 211a, a sidewall 211b, and an internal space 211c. The guide 211 may have one portion, for example one face that is open. The bottom wall 211a is provided with a through-hole 211d through which the transfer member rotational shaft 51 and the fixing member 230 pass. Supporting walls 211e supported on the ice bucket 30 protrude outward from the bottom wall 211a.

Meanwhile, when the pressurizing faces 120*b* of the wings 120 of the driving coupler 100 contact with front faces of the ribs 212 in a process of connecting with the driving coupler 100, a rotating force is applied to the ribs 212. Here, the connecting member 210 idles regardless of the transfer member 50.

Assuming that the driving coupler 100 transmits the driving force while rotating in a counterclockwise direction, for example, the idling direction of the connecting member 210 may be a clockwise direction. This is why the inclined faces 120*a* of the wings 120 of the driving coupler 100 rotate the connecting member 210 in the opposite sides of the pressurizing faces 120*b*. The driving coupler 100 may also rotate in a clockwise direction and the idling direction of the connecting member 210 may be a counterclockwise direction.

The supporting member 220 supports the connecting member 210 and simultaneously receives a driving force in contact with the ribs 212 of the connecting member 210. The supporting member 220 may be disposed in the internal space 211*c* of the connecting member 210.

The supporting member 220 may include a cylindrical body 221 in which a hollow 221*a* is formed, a disc 222 that extends from one end of the body 221 in a radial direction and supports the sidewall 211*b* of the guide 211, a bottom support 223 that extends the other end of the body 221 in a radial direction and supports the bottom wall 211*a* of the guide 211, and a second joint 224 to which the other end of the positioning member 240 is coupled.

A radius of the disc 222 may approximately correspond to or be slightly smaller than a radius of the inner circumference of the connecting member 210. The disc 222 is provided with recesses 222*a* through which the ribs 212 of the connecting member 210 pass.

Each recess 222*a* is formed larger than each rib 212 so that each rib 212 may be independently rotated within a predetermined angle range without pressurizing the supporting member 220. That is, a predetermined interval D (FIG. 6) is formed between each rib 212 and an edge 222*b* of each recess 222*a* so that the connecting member 210 may idle without contact.

The positioning member 240 is configured so that one end thereof is coupled to the first joint 213 provided for the connecting member 210 and the other end thereof is coupled to the second joint 224 provided for the supporting member 220. The positioning member 240 may be a type of a spring such as a coil tensile spring, for example.

The positioning member 240 may restore the connecting member 210 to its initial position when the pressurizing force applied to the connecting member 210 by the driving coupler 100 is released. That is, the positioning member 240 elastically supports the connecting member 210 so that the predetermined interval D is formed between the rib 212 of the connecting member 210 and the edge 222*b* of the recess 222*a*.

The fixing member 230 couples the supporting member 220 to the transfer member 50. The fixing member 230 may be integrally formed with the supporting member 220.

The fixing member 230 is inserted into the hollow 221*a* of the supporting member 220 and is coupled so as to be rotated along with the supporting member 220. As an example, the hollow 221*a* of the supporting member 220 may be formed in a rectangular shape, and the fixing member 230 may also be formed in a rectangular shape. Thus, the supporting member 220 and the fixing member 230 may be rotated together.

Further, the fixing member 230 is coupled so as to be rotated along with the transfer member 50. As an example, the fixing member 230 may be provided with a female thread part 231*a* into which the transfer member rotational shaft 51 may be inserted, and the transfer member rotational shaft 51 may be provided with a male thread part 52 screwed to the female thread part 231*a*. Thus, the fixing member 230 and the transfer member rotational shaft 51 may be screwed.

As a result, all of the supporting member 220, the fixing member 230, and the transfer member 50 may be rotated together. The supporting member 220, the fixing member 230, and the transfer member 50 may be integrally formed.

The fixing member 230 may include a body 231 coupled to the supporting member 220 and the transfer member 50 and a head 232 formed at one end of the body 231 so as to prevent separation of the supporting member 220.

Figure 7:
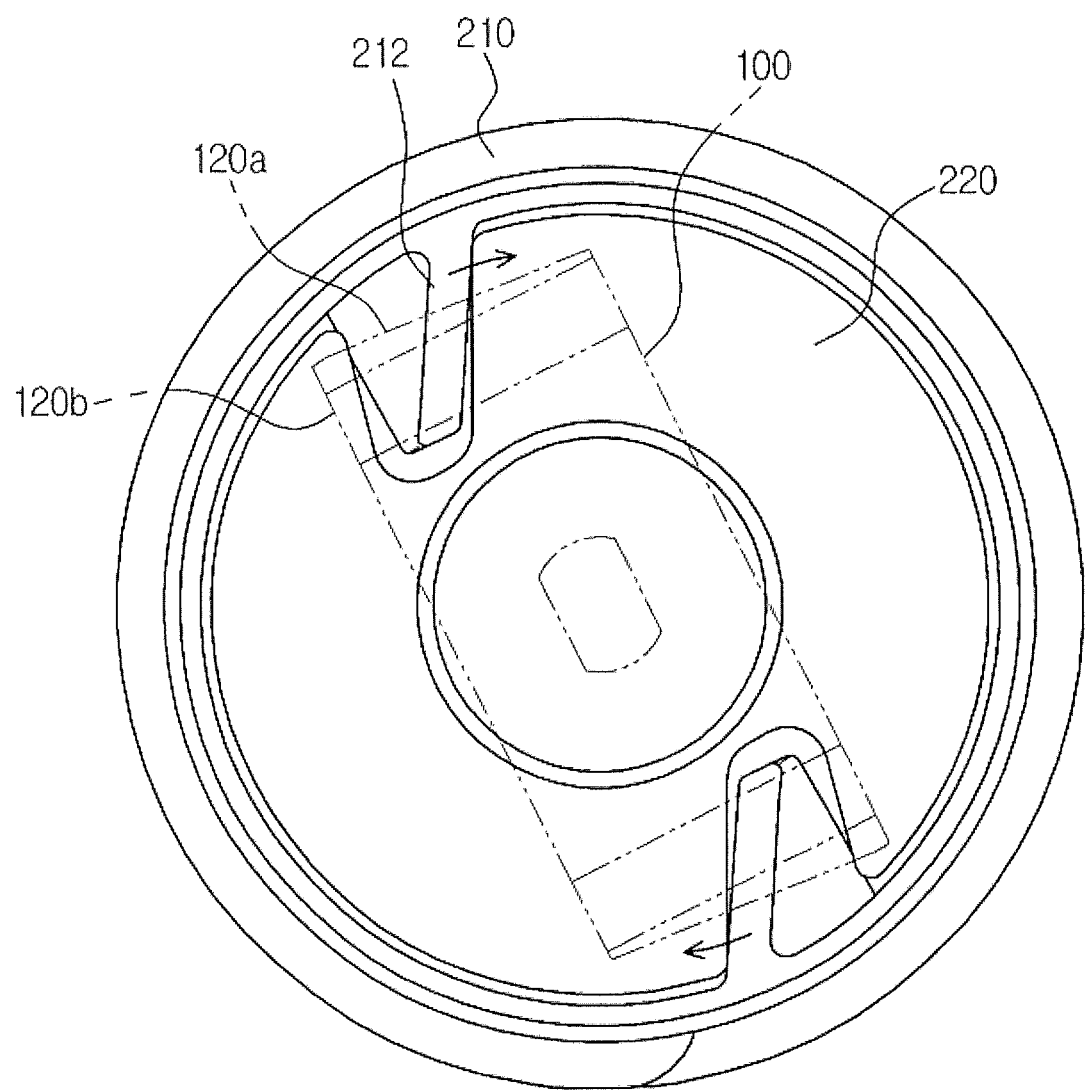
FIG. 7 shows a state in which the connecting member of the driven coupler idles in a clockwise direction due to collision when the driving and driven couplers of the refrigerator of FIG. 1 are connected.
Figure 8:
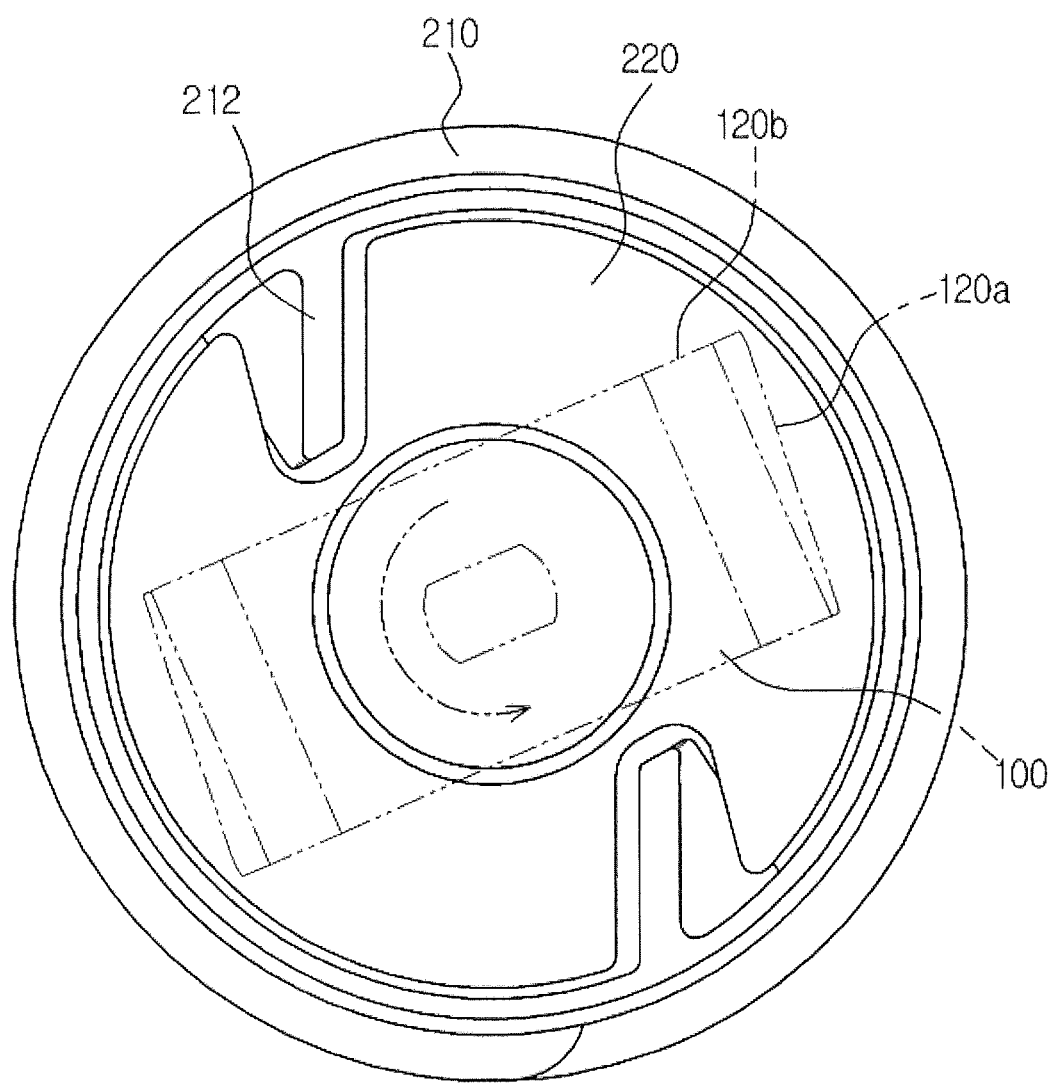
FIG. 8 shows a state in which the driving motor is driven in the state of FIG. 7, and the driving coupler is rotated in a clockwise direction.
Figure 9:
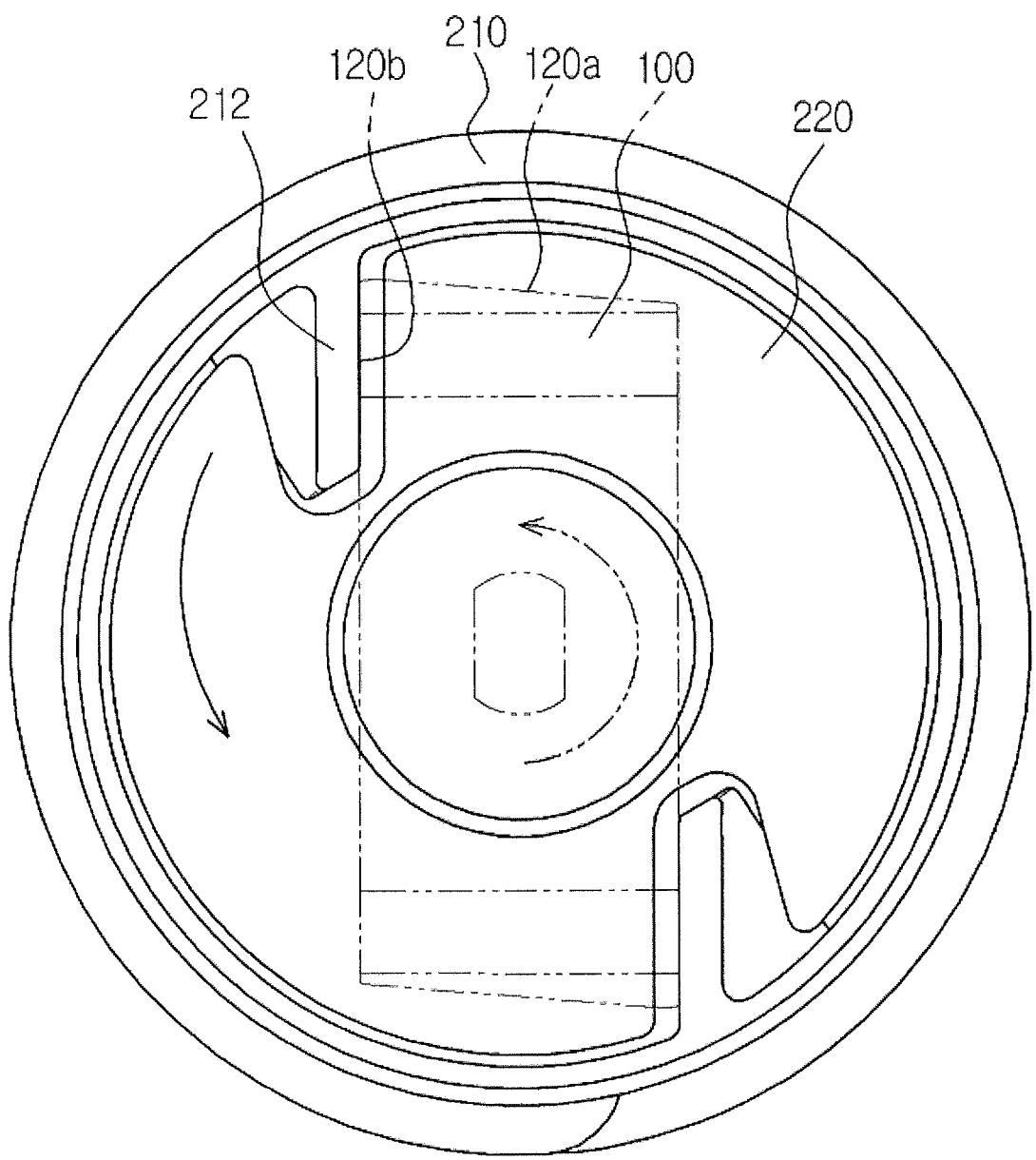
FIG. 9 shows a state in which the driving coupler comes into contact with lateral portions of the ribs of the driven coupler and begins to transmit a driving force to the connecting member.

FIG. 7 shows a state in which the connecting member of the driven coupler idles in a clockwise direction due to collision when the driving and driven couplers of the refrigerator of FIG. 1 are connected. FIG. 8 shows a state in which the driving motor is driven in the state of FIG. 7, and the driving coupler is rotated in a clockwise direction. FIG. 9 shows a state in which the driving coupler comes into contact with lateral faces of the ribs of the driven coupler and begins to transmit a driving force to the connecting member in the state of FIG. 8.

Hereinafter, an operation of the coupler of the refrigerator according to the first embodiment of the present disclosure will be described in brief with reference to FIGS. 1 to 9.

First, as shown in FIG. 6, in a state in which the driving coupler 100 and the driven coupler 200 are connected, the connecting member 210 of the driven coupler 200 is elastically supported at a basic position by the positioning member 240.

That is, a predetermined interval D is formed between the rib 212 of the connecting member 210 and the supporting member 220 so that the connecting member 210 may idle.

As shown in FIG. 7, when the driving coupler 100 and the driven coupler 200 approach each other for connection, the driving coupler 100 interferes and contacts with the front faces of the ribs 212 of the connecting member 210, and a rotating force is applied to the ribs 212 by the inclined faces 120*a* of the driving coupler 100. Thereby, the connecting member 210 is rotated.

Here, even when the connecting member 210 is rotated, the ribs 212 do not come into contact with the supporting member 220 within a predetermined angle range. As such, the rotating force of the connecting member 210 is not transmitted to the supporting member 220, and only the connecting member 210 is rotated.

The reason the connecting member 210 is configured to be able to idle within the predetermined angle range in this way is to allow the connecting member 210 to be rotated regardless of the transfer member 50 even when it is difficult for the transfer member 50 to be rotated due to loading of ice cubes stored in the ice bucket 30.

That is, the connecting member 210 may be smoothly rotated even in a situation in which the ice cubes stored in the ice bucket 30 are loaded on the transfer member 50. Thereby, the wings 120 of the driving coupler 100 may smoothly enter between the lateral faces of the ribs 212 of the connecting member 210, and the smooth connection of the driving coupler 100 and the driven coupler 200 may be completed.

Afterwards, when the driving motor 70 is driven, the driving coupler 100 may be rotated as shown in FIG. 8. When the driving coupler 100 may be rotated, the pressurizing faces 120b of the wings 120 of the driving coupler 100 pressurizes the lateral faces of the ribs 212 of the connecting member 210 as shown in FIG. 9, so that the driving force may be transmitted.

Figure 10:
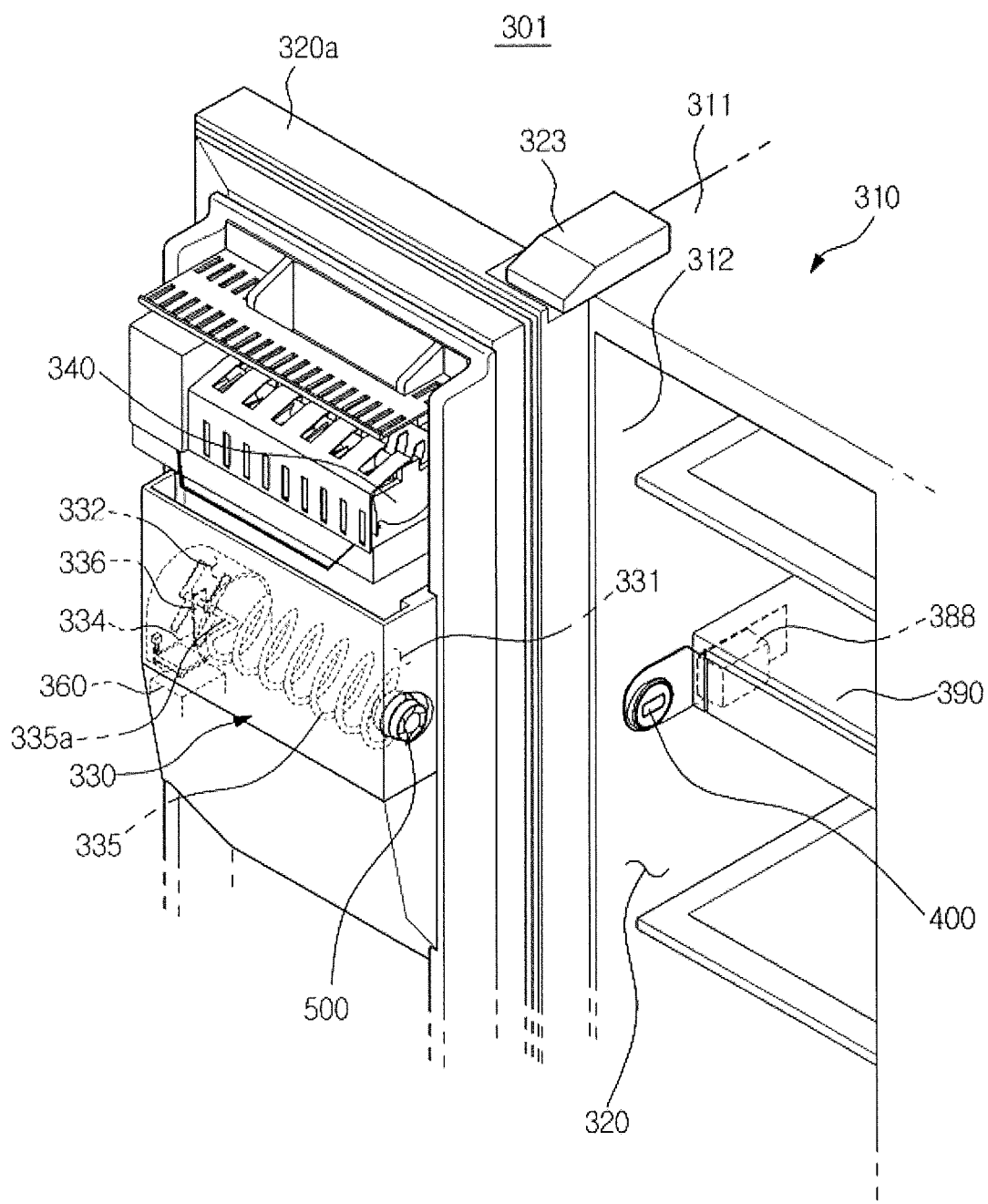
FIG. 10 shows a refrigerator according to a second embodiment of the present disclosure wherein an icemaker is provided at a door, and a driver is provided at a main body.

FIG. 10 shows a refrigerator according to a second embodiment of the present disclosure wherein an icemaker is provided at a door, and a driver is provided at a main body. Hereinafter, description of the same components as the first embodiment will be omitted.

Referring to FIG. 10, a refrigerator 301 according to an embodiment of the present disclosure includes a main body 310, a storage compartment 320 formed inside the main body 310, and a cooled air supply system (not shown). The cooled air supply system may cool the storage compartment 320 to a sub-zero temperature. That is, the storage compartment 320 may be a freezing compartment.

The main body 310 includes an inner case 312 forming the storage compartment 320, an outer case 311 coupled to an outer side of the inner case 312, and an insulator 313 (FIG. 12) disposed between the inner and outer cases 312 and 311. As the insulator 313, a urethane foam may be used. After the inner case 312 and the outer case 311 are coupled, the urethane foam may be formed between the inner case 312 and the outer case 311 by foaming and curing a urethane undiluted solution.

A door 320a may be rotatably coupled to the main body 310 by a hinge 323 so as to open/close an open front portion, for example, an open front face of the storage compartment 320. Meanwhile, the door 320a is provided with an icemaker 340 to generate ice cubes and an ice bucket 330 to store the ice cubes generated by the icemaker 340. The icemaker 340 may generate the ice cubes with the cooled air of the storage compartment 320.

The ice bucket 330 is provided in the rear of the door 320a so as to be located at a lower side of the icemaker 340. The ice bucket 330 may have a storage space 331 to contain the ice cubes dropped from the icemaker 340 and a crush space 332 capable of crushing the ice cubes.

The storage space 331 and the crush space 332 may be horizontally provided in parallel. An outlet 334 through which the ice cubes of the ice bucket 330 are discharged may be provided at a lower portion of the crush space 332. The outlet 334 may be connected to a chute 360 guiding the ice cubes to an extraction space of a dispenser.

The ice bucket 330 may be provided with a transfer member 335 to transfer the ice cubes and a crusher 336 to crush the ice cubes.

The transfer member 335 may be horizontally disposed in an approximately spiral shape. Thus, when the transfer member 335 is rotated, the ice cubes of the ice bucket 330 may be displaced toward the crusher 336 or the outlet 334 in a horizontal direction.

Meanwhile, the main body 310 is provided with a driver for driving the transfer member and the crusher. The driver includes a driving motor 370 (FIG. 11) to generate a driving force and a motor housing 380 to receive the driving motor 370.

Further, the refrigerator includes a coupler to transmit power between the transfer member 335 of the ice bucket 330 provided in the rear portion of the door 320a and the driving motor 370 provided in the main body 310 in this way.

The coupler is made up of a driving coupler 400 coupled to a driving shaft 370a of the driving motor 370 and a driven coupler 500 coupled to a rotational shaft 335a of the transfer member 335. The driving and driven couplers 400 and 500 may be decoupled from each other when the door 320a is opened and be coupled when the door 320a is closed so as to be able to transmit the power.

Hereinafter, a detailed constitution of the coupler of the present disclosure will be described.

Figure 11:
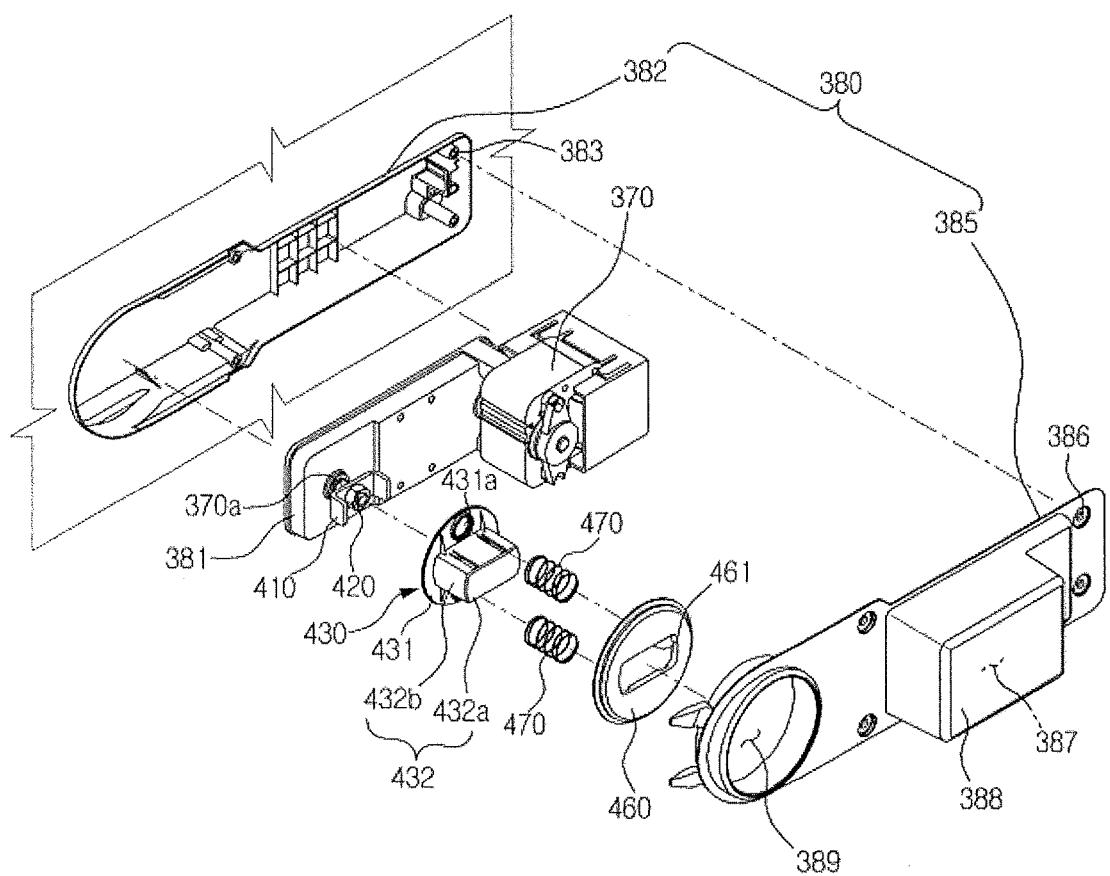
FIG. 11 is an exploded perspective view showing the driver of the refrigerator of FIG. 10.
Figure 12:
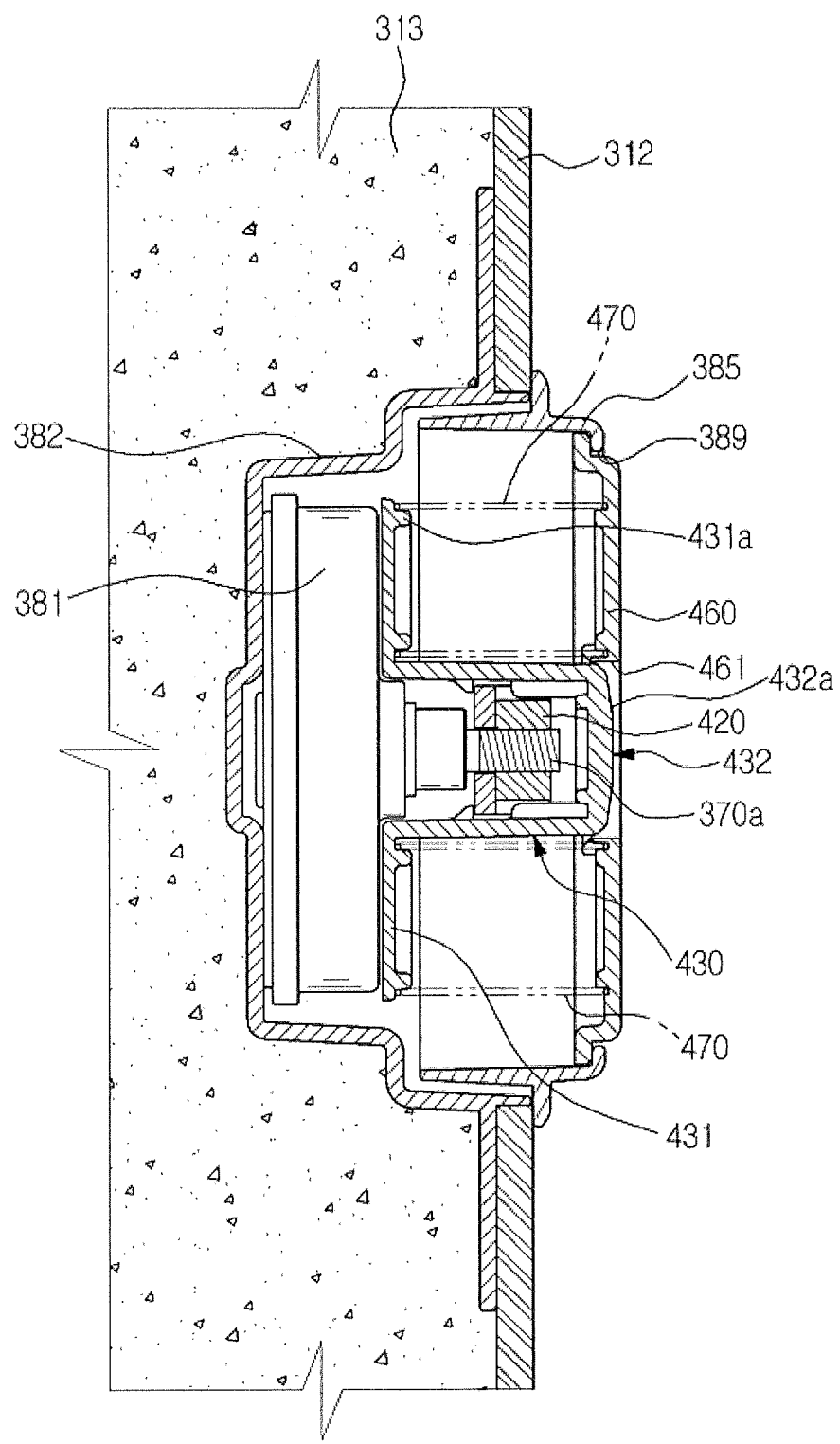
FIG. 12 is a cross-sectional view of the driver of the refrigerator of FIG. 10.

FIG. 11 is an exploded perspective view showing the driver of the refrigerator of FIG. 10, and FIG. 12 is a cross-sectional view of the driver of the refrigerator of FIG. 10.

Referring to FIGS. 11 and 12, the driver includes the driving motor 370 to generate a driving force and the motor housing 380 to receive the driving motor 370. The driving force of the driving motor 370 is properly reduced in speed by a gearing part 381 and is transmitted to the driving shaft 370a. The gearing part 381 may include a reduction gear or a belt, for example.

The driving coupler 400 may be coupled to the driving shaft 370a and be rotated along with the driving shaft 370a. The driving coupler 400 may be coupled to the driving shaft 370a through a connecting bracket 410.

The connecting bracket 410 may have the form of an approximately C-shaped bracket and be coupled to the driving shaft 370a so as to be rotated along with the driving shaft 370a. A fixing member 420 to fix the connecting bracket 410 may be coupled to the driving shaft 370a. The fixing member 420 may be a type of a nut, for example.

The driving coupler 400 may be made up of a first coupler 430, a cover 460, and first elastic members 470. The first coupler 430 may be coupled to the connecting bracket 410 and be rotated along with the connecting bracket 410.

The first coupler 430 may include a disc 431 having an approximately circular shape and an insertion nose 432 to protrude from the disc 431. The disc 431 may be provided with supports 431a that may support the first elastic members 470.

Figure 13:
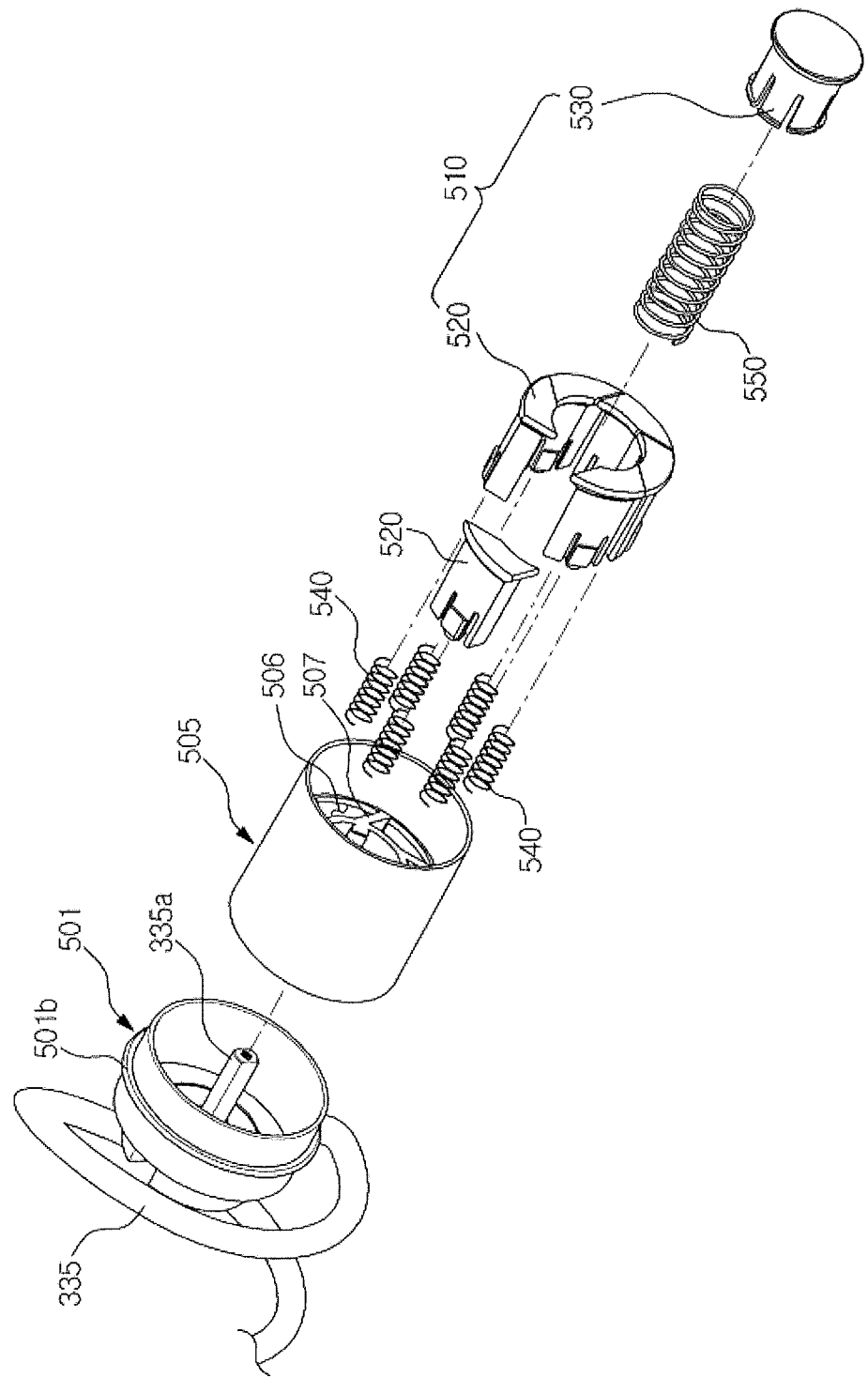
FIG. 13 is an exploded perspective view showing the driven coupler of the refrigerator of FIG. 10.

The first coupler 430 may be coupled to a second coupler 510 (FIG. 13) of the driven coupler 500. Here, the insertion nose 432 of the first coupler 430 may be pushed into a portion 520a (FIG. 15) of a plurality of slide members 520 (FIG. 13) and a filler member 530 (FIG. 13).

In this state, when the driving motor 370 is driven, the insertion nose 432 may come into contact with lateral portions, for example, lateral faces of the slide members 520b adjacent to the pushed slide members 520a and transmit a rotating force.

Meanwhile, the cover 460 may hide the insertion nose 432 so that the insertion nose 432 is not exposed to the outside when a door 320a is opened. Here, to "hide" refers that the insertion nose 432 does not protrude, i.e. refers that the cover 460 moves to a position corresponding to a top portion, for example, a top face 432a of the insertion nose 432, and thus lateral faces 432b of the insertion nose 432 are not be exposed to the outside.

When the insertion nose 432 is hidden in this way, an external design may be improved, and an accident of a user who suffers from an injure and a discomfort caused by the contact with the insertion nose 432 while the refrigerator is in use may be prevented. Further, the convenience of use may be improved.

The cover 460 has an opening 461 through which the insertion nose 432 passes. The cover 460 is provided so as to be able to move forward or backward in an axial direction of the driving shaft 370a and to hide or expose the insertion nose 432 from or to the outside.

The cover 460 may be elastically supported by the first elastic members 470. A plurality of first elastic members 470 may be provided at opposite sides of the insertion nose 432 as shown. The first elastic members 470 elastically support the cover 460 so as to hide the insertion nose 432. The first elastic members 470 may be a type of springs such as compressive coil springs, for example.

The cover 460 may be pressurized and retreated in an axial direction by a guide 505 of the driven coupler 500. Thus, the insertion nose 432 may be exposed to the outside. Here, when the pressuring force is released, the cover 460 may be restored to a position at which the insertion nose 432 is hidden again by an elastic force of the first elastic members 470.

The motor housing 380 may include a first motor housing 382 and a second motor housing 385.

The first motor housing 382 is formed and disposed in the insulator 313 between the inner case 312 and the outer case 311. Thus, the first motor housing 382 may be supported by the inner case 312 and the insulator 313. The first motor housing 382 is open to the storage compartment 320.

Here, before the insulator is foamed, the first motor housing 382 is temporarily fixed to the inner case 312. After the first motor housing 382 is temporarily fixed to the inner case 312, the insulator is foamed. Thereby, the first motor housing 382 may be firmly fixed by an adhesive force of the insulator itself.

The second motor housing 385 is coupled to an opening of the first motor housing 382. The second motor housing 385 and the first motor housing 382 have respective coupling holes 386 and 383. Fastening members such as screws may be fastened to the coupling holes 386 and 383.

The second motor housing 385 has a protrusion 388 to protrude toward the storage compartment 320 so as to form a holding space 387 to hold the driving motor 370.

Further, the second motor housing 385 is provided with an opening 389 through which the second coupler 510 may pass when the first and second couplers 430 and 510 are coupled.

Meanwhile, the storage compartment 320 may be provided with a mini drawer 390 in which thin small foodstuffs may be stored. The mini drawer 390 may hide the protrusion 388 of the second motor housing 385 so as to prevent exposure to the outside. Since the protrusion 388 of the second motor housing 385 is hidden by the mini drawer 390 and thus is not exposed to the outside, an external appearance may be improved.

Figure 14:
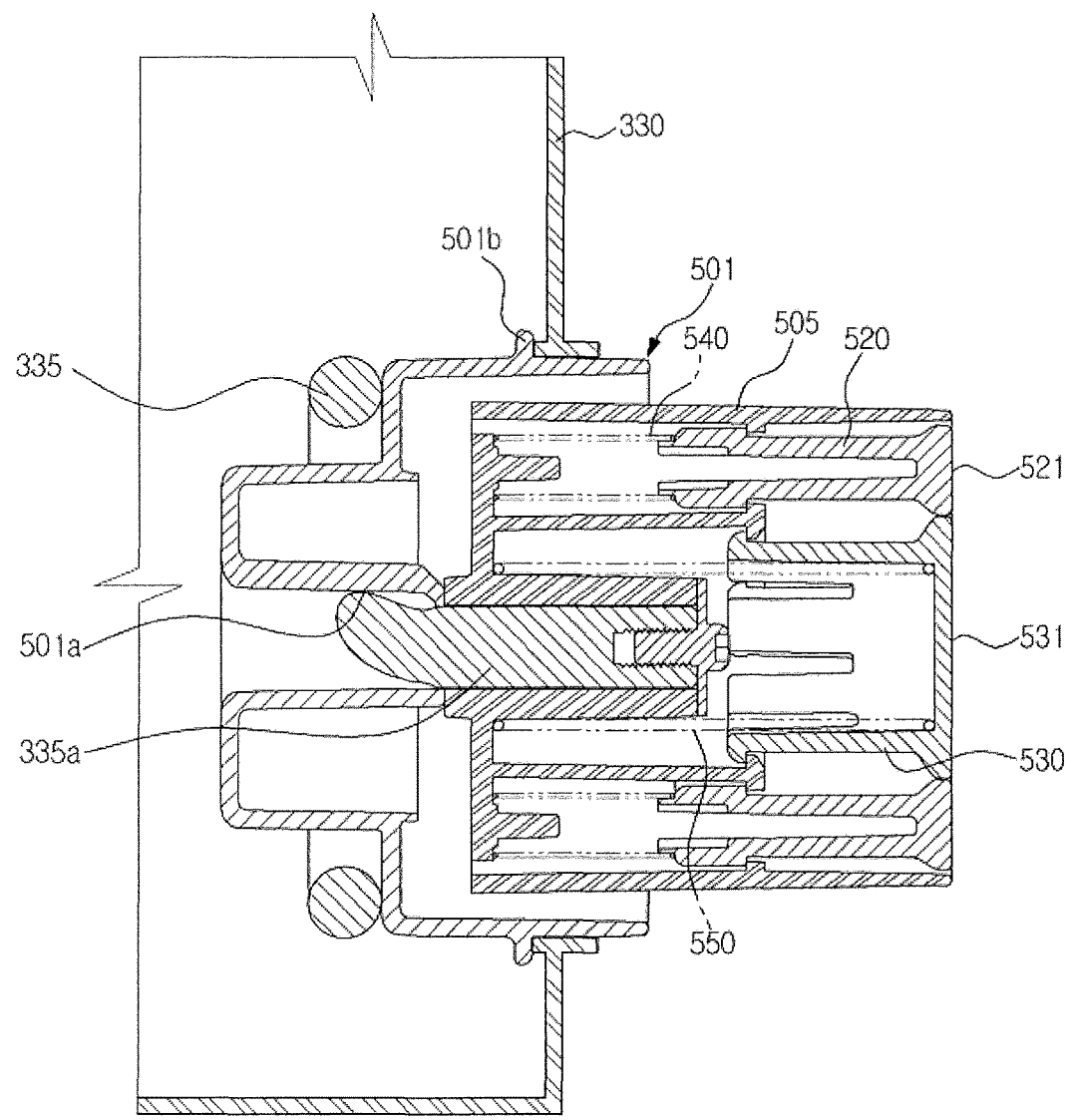
FIG. 14 is a cross-sectional view of the driven coupler of the refrigerator of FIG. 10.
Figure 15:
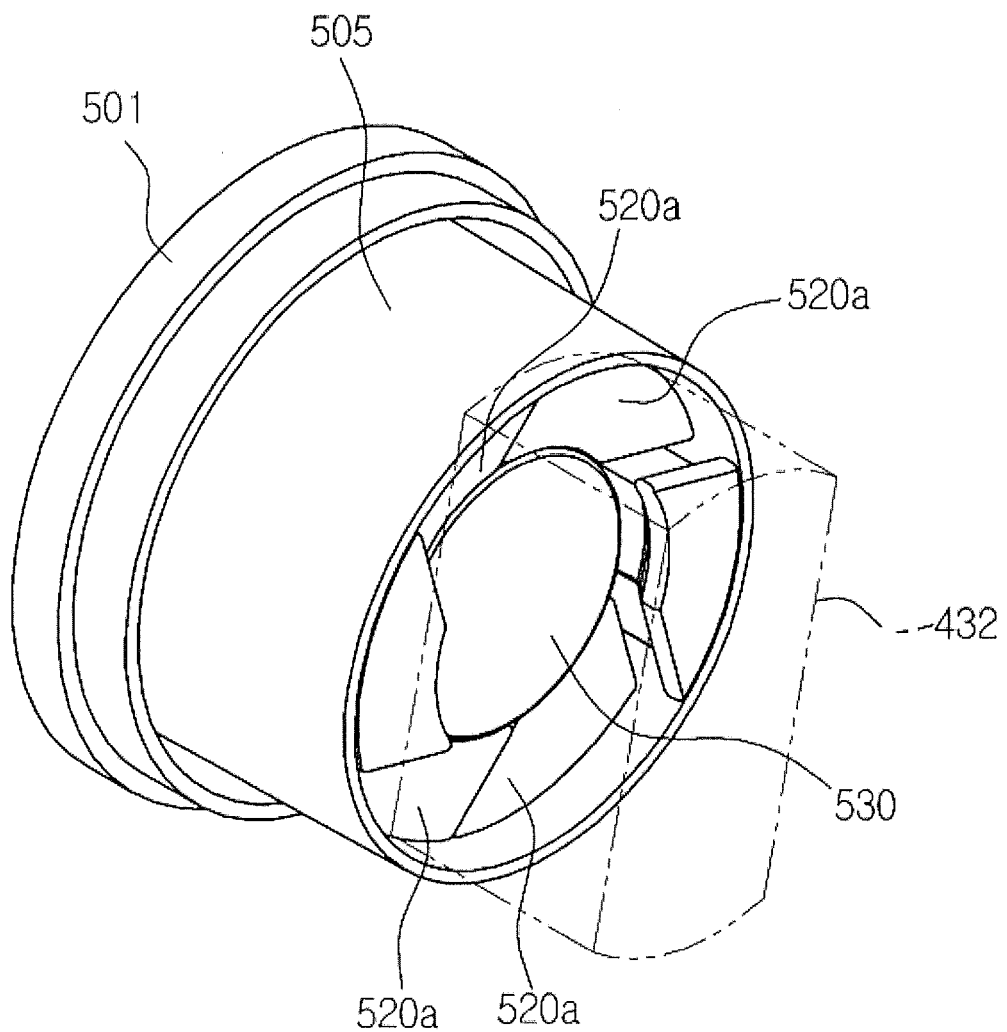
FIG. 15 shows a state in which the insertion nose is pushed into a portion of the plurality of slide members when the driving and driven couplers of the refrigerator of FIG. 10 are coupled.
Figure 16:
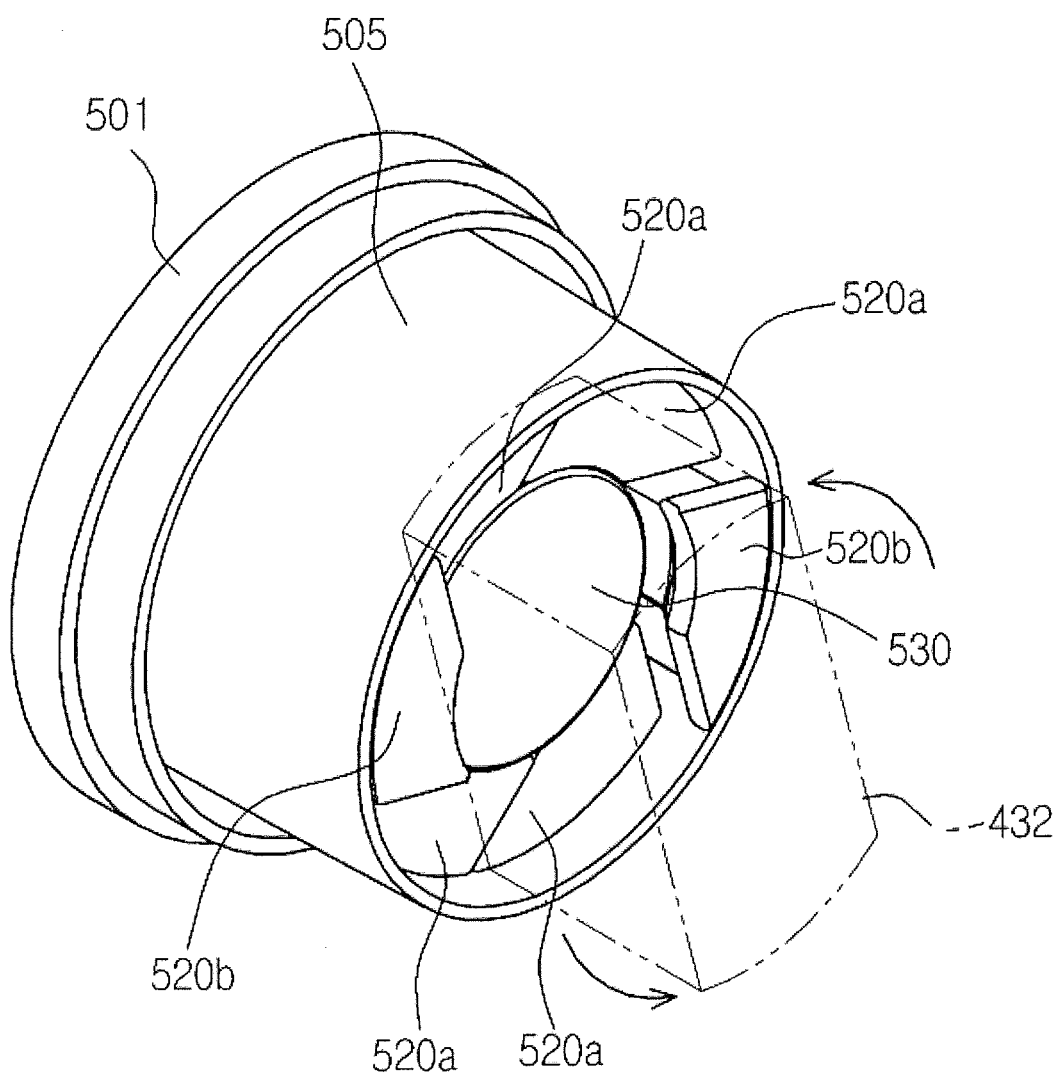
FIG. 16 shows a state in which the driving motor is driven in the state of FIG. 15, and thus the insertion nose is in contact with the lateral portions of the slide members.
Figure 17:
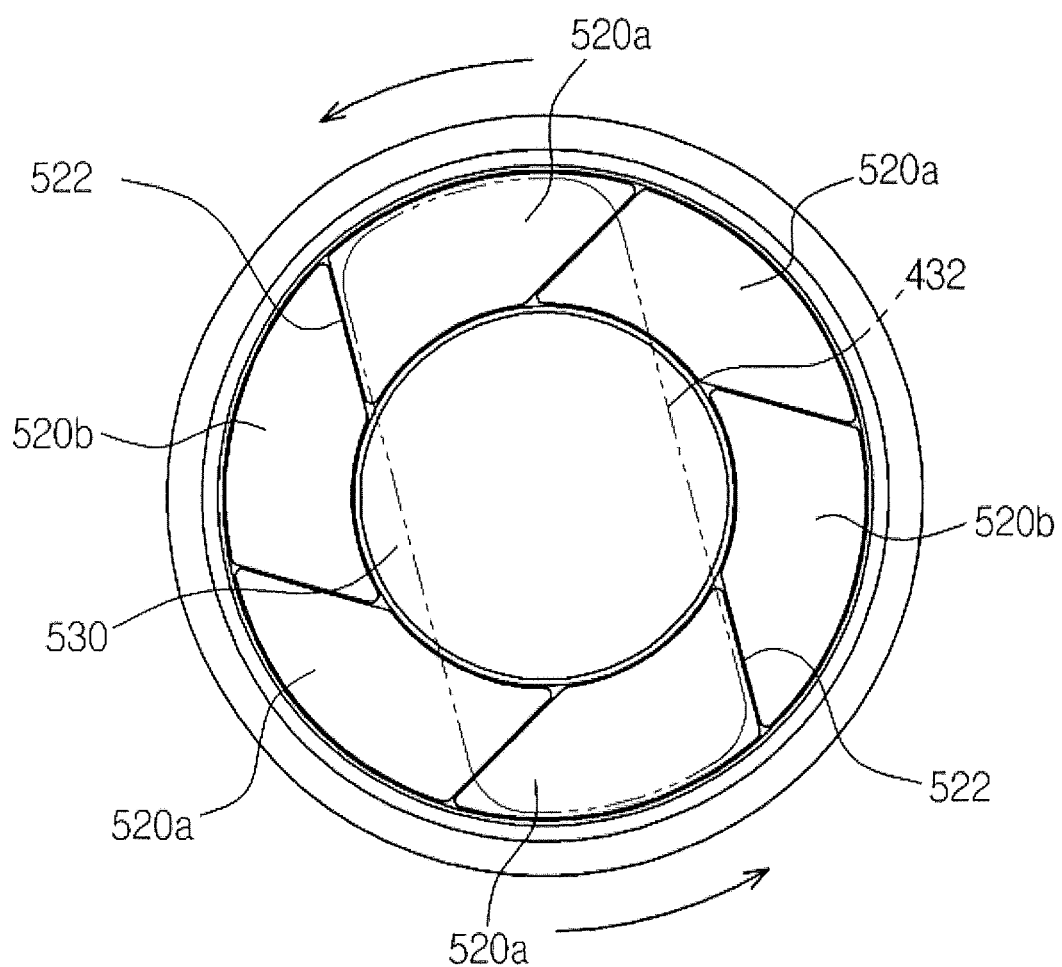
FIG. 17 is a view for describing shapes of the slide members of the refrigerator of FIG. 10.

FIG. 13 is an exploded perspective view showing the driven coupler of the refrigerator of FIG. 10. FIG. 14 is a cross-sectional view of the driven coupler of the refrigerator of FIG. 10. FIG. 15 shows a state in which the insertion nose is pushed into a portion of the plurality of slide members when the driving and driven couplers of the refrigerator of FIG. 10 are coupled. FIG. 16 shows a state in which the driving motor is driven in the state of FIG. 15, and thus the insertion nose is in contact with the lateral faces of the slide members. FIG. 17 is a view for describing shapes of the slide members of the refrigerator of FIG. 10.

Referring to FIGS. 14 to 17, the driven coupler 500 may include a base 501, a guide 505, a second coupler 510, a plurality of second elastic members 540, and a third elastic member 550. Here, the second coupler 510 may include a plurality of slide members 520 arranged in a row in a circumferential direction and a filler member 530 disposed in an inner center of the plurality of slide members 520.

The base 501 may have a shape of a cylinder whose one portion, for example, one face is open, and supports the guide 505 disposed in an internal space thereof. The base 501 is coupled so as to be rotated along with the transfer member 335. The base 501 may have a shaft hole 501a to which a transfer member rotational shaft 335a is coupled and a flange 501b that protrudes from an outer circumference thereof so as to fix a position of the base 501 and is supported on the ice bucket 330.

The guide 505 is disposed in the internal space of the base 501 so as to be fixed to the base 501. The guide 505 is also coupled so as to be rotated along with the transfer member rotational shaft 335a. Thus, the guide 505, the base 501, and the transfer member 335 are rotated together.

The guide 505 is provided with a holding space 506 that may hold the plurality of slide members 520, the plurality of second elastic members 540, the filler member 530, and the third elastic member 550. Guide walls 507 partitioning the holding space 506 may guide movements of the plurality of slide members 520 and the filler member 530.

The second coupler 510 is to transmit power by the coupling with the first coupler 430 of the driving coupler and includes the plurality of slide members 520 arranged in a row in the circumferential direction and the filler member 530 disposed in the inner center of the plurality of slide members 520 and supporting the plurality of slide members 520.

The plurality of slide members 520 may have the same shape.

Each slide member 520 may move forward or backward in an axial direction of the transfer member 335. Further, the filler member 530 may also move forward or backward in an axial direction.

Each slide member 520 has a slide contact portion, for example, a slide contact face 521 that comes into contact with the insertion nose 432 of the first coupler 430, and the filler member 530 also has a filler contact portion, for example, a filler contact face 531 that comes into contact with the insertion nose 432 of the first coupler 430.

When the second coupler 510 is viewed from the outside in an axial direction, the plurality of slide contact faces 521 are arranged in a row in a circumferential direction without a substantial gap. Further, the plurality of outer slide contact faces 521 and the central filler contact face 531 are also arranged without a substantial gap.

Thus, when the second coupler 510 is viewed from the outside in an axial direction, the second coupler 510 may be completely divided by the plurality of slide members 520 and the filler member 530.

Each slide member 520 may be elastically supported by the second elastic members 540, and the filler member 530 may also be elastically supported by the third elastic member 550. Here, the plurality of slide members 520 and the filler member 530 may be elastically supported so that the plurality of slide contact faces 521 and the filler contact face 531 are formed so as to be approximately flat.

Thus, when the door 320a is opened, the driven coupler 500 has a flat contact portion, for example, a flat contact face without irregularity, and thus an external design is spoiled.

Meanwhile, as shown in FIG. 15, when the door 320a is closed and thus the insertion nose 432 comes into contact with the second coupler 510, the insertion nose 432 may push and enter a portion of slide members 520a, which are located at opposite positions among the plurality of slide members 520 of the second coupler 510, and the filler member 530.

Here, the elastic members elastically supporting the pushed a portion of slide members 520a and the pushed filler member 530 are compressed to accumulate an elastic force.

In this state, when the driving motor 370 is driven and thus the insertion nose 432 is rotated, the insertion nose 432 comes into contact with the lateral faces of the slide members 520b adjacent to the pushed slide members 520a and applies a rotating force, as shown in FIG. 16.

Here, as shown in FIG. 17, to allow the rotating force of the insertion nose 432 to be more reliably transmitted to the slide members 520, the lateral faces of the slide members 520 may be provided so as to be in surface contact with the insertion nose.

That is, each slide member 520 may have a surface contact part 522 that comes into surface contact with the insertion nose 432.

When the driving motor 370 is stopped and the door 320a is opened, the pushed slide members 520a and the filler member 530 are restored to their original positions again by the elastic force.

In this way, the coupler of the refrigerator according to an embodiment of the present disclosure may be smoothly coupled regardless of the position of the driving coupler 400 when the door 320a is closed to connect the driving and driven couplers 400 and 500, and is improved in external appearance and safety. Since the insertion nose 432 of the driving coupler 400 and the slide members 520 of the driven coupler 500 are in surface contact with each other, the efficiency of power delivery is improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:
an icemaker that generates ice cubes;
an ice bucket that stores the ice cubes generated by the icemaker;
a transfer member that transfers the ice cubes of the ice bucket;
a driving motor that generates a driving force to rotate the transfer member;
a driving coupler coupled to the driving motor;
a connecting member that is provided between the driving coupler and the transfer member and transmits the driving force of the driving coupler to the transfer member by rotating together with the driving coupler when the driving coupler is coupled to the connecting member, the connecting member being configured to rotate independently from the transfer member within a predetermined range of angles; a supporting member that contacts with ribs of the connecting member to receive the driving force and supports the connecting member; and a fixing member that couples the supporting member to a rotational shaft of the transfer member.

2. The refrigerator according to claim 1, wherein the supporting member includes a body having a hollow space and a disc that extends from one end portion of the body in a radial direction and supports an inner circumference of the connecting member.

3. The refrigerator according to claim 2, wherein the disc includes recesses through which the ribs of the connecting member pass.

4. The refrigerator according to claim 3, wherein the recess is formed larger than the rib so as to allow the connecting member to independently rotate within the predetermined range of angles without pressuring the supporting member.

5. The refrigerator according to claim 1, further comprising a positioning member that connects the supporting member and the connecting member so as to adjust a relative position of the connecting member relative to the supporting member.

6. The refrigerator according to claim 1, wherein the fixing member includes a body coupled to the supporting member and the connecting member and a head formed at one end portion of the body so as to prevent separation of the supporting member.

7. The refrigerator according to claim 1, wherein the fixing member, the supporting member, and the connecting member are rotated together when the driving coupler is coupled to the connecting member.

8. The refrigerator according to claim 1, wherein the connecting member has an idling direction that is opposite to a direction in which the connecting member is rotated so as to transmit the driving force to the transfer member.

9. The refrigerator according to claim 1, wherein the driving coupler includes a support having a shaft hole where a driving shaft of the driving motor is coupled to and a plurality of wings bent towards the connecting member from opposite end portions of the support, and when the driving coupler is not coupled to the connecting member, the driving coupler contacts with a front portion of the ribs of the connecting member, and a rotating force is applied to the ribs by the plurality of wings to rotate the connecting member so that the driving coupler is coupled to the connecting member, and when the driving coupler is coupled to the connecting member, the plurality of ribs contact with the supporting member so that the rotating force of the connecting member is transmitted to the supporting member.

* * * * *